United States Patent [19]

Minotti

[11] Patent Number: 5,736,057

[45] Date of Patent: Apr. 7, 1998

[54] PROCESS FOR THE PURIFYING OF WATERS FOR HUMAN CONSUMPTION

[75] Inventor: Luigi Minotti, Leggiuno, Italy

[73] Assignee: Promox S.R.L., Varese, Italy

[21] Appl. No.: 657,428

[22] Filed: Jun. 3, 1996

Related U.S. Application Data

[63] Continuation of Ser. No. 282,517, Jul. 28, 1994, abandoned.

[30] Foreign Application Priority Data

Jul. 29, 1993 [IT] Italy .................... MI93A1700

[51] Int. Cl.$^6$ .................................................. C02F 1/72
[52] U.S. Cl. ................... 210/759; 210/764; 422/28; 504/157; 514/557
[58] Field of Search ............... 162/161; 210/759, 210/764; 422/28, 37; 514/557; 504/157

[56] References Cited

U.S. PATENT DOCUMENTS

| 4,219,418 | 8/1980 | Pilon .................... 210/721 |
| 4,282,104 | 8/1981 | Pacini et al. ............ 210/908 |
| 4,966,775 | 10/1990 | Donofrio et al. ......... 424/661 |
| 5,324,432 | 6/1994 | Robertson et al. ........ 210/764 |
| 5,368,749 | 11/1994 | La Zonby ............... 210/764 |
| 5,393,781 | 2/1995 | Vegega et al. ........... 514/557 |
| 5,409,713 | 4/1995 | Lokkesmoe et al. ...... 210/759 |

FOREIGN PATENT DOCUMENTS

| 740587 | 3/1989 | Czechoslovakia . |
| 9201631 | 4/1994 | Denmark . |
| 2303766 | 11/1976 | France ............... 210/764 |
| 54028447 | 3/1973 | Japan . |
| 51094001 | 8/1976 | Japan . |
| 54105852 | 8/1979 | Japan . |
| 63097288 | 4/1988 | Japan . |
| 1236989 | 9/1989 | Japan . |
| WO92 15529 | 7/1992 | WIPO ............... 210/759 |
| WO9420424 | 9/1994 | WIPO . |

OTHER PUBLICATIONS

*Annex 1*—European community regulations on the quality of water for human consumption, Aug. 30, 1980, N.L. 229/11–29.

*Annex 2*—Abstract of the paper: "Evaluation of Water Mutagenicity and Toxicity After Disinfection With Peracetic Acid", Monarca et al., Sep. 1995.

*Annex 3*—Paper relating to the maximum acceptable amount of halo–organic compounds in drinkable water, Specchiarello et al., Jan. 1992.

*Annex 4*—Paper of University of Brescia, Monarca, Brescia Italy.

*Primary Examiner*—Peter A. Hruskoci
*Attorney, Agent, or Firm*—Collard & Roe, P.C.

[57] ABSTRACT

Process for the purifying of waters for human consumption by means of a treatment with organic peracids, such as peracetic acid, performic acid, perpropionic acid.

9 Claims, 5 Drawing Sheets

PROCESS FOR THE PURIFYING OF WATERS FOR HUMAN CONSUMPTION

This is a continuation of application Ser. No. 08/282,517 filed on Jul. 28, 1994 now abandoned.

SUBJECT MATTER

This invention relates to a process for the purifying of waters for human consumption, which is simply realizable, does not give rise to the formation of mutagenic-cancerogenic agents, and does not cause, in purified waters, bad tastes, with the associated discomforts for users.

STATE OF THE ART

As is known, waters for human consumption are drawn from natural hydric reserves, such as, for instance, lakes, rivers, natural or artificial basins, natural water beds, and the like, and before being run into the water systems they are subject, during the purifying, to treatments of various type, suitable to remove possible toxic substances, organic and/or inorganic pollutants, as well as the bacterial load which is present in such natural hydric reserves.

In the last years, many experimental researches, carried out, for instance, by H. F. KRAYBILL J.Am. Water Works Assoc., 73.370 (1981); J. R. Meier Mutat. Res. 196,211 (1988), have noticed in purified waters the presence of mutagenic agents, which is cause for concern because of the potential toxic effect of such agents in man. In fact, one means by mutagenic agent any chemical composition capable of interacting with the cellular genetic heredity, causing irreversible alterations that are responsible for many human pathologies, such as hereditary diseases, congenital malformations, malignant tumors and the like. Among the sources of pollution due to mutagenic-cangerogenic agents in drinking-waters, besides the drawn waters, which turn out to be more and more polluted, and the distribution systems, such as pipeworks and reservoirs, also the purifying systems used today should be mentioned, among which chlorination, which is at present the most widespread method. Such method, which involves the use of chlorine gas, hypochlorites or chlorine dioxide, has been accused for some years, as such substances present in waters, in particular the nitrogenous ones, give rise to the formation of many chlororganic compositions whose mutagenic activity has been demonstrated. The formation of mutagenic products is noticed even when surface waters with a high degree of purity are utilized for the purifying, as such waters contain substances which originate from the decay of vegetables, for instance humic and fulvic acids, which form with chlorine mutagenic-cangerogenic agents, such as triahalomethanes, chloroform, and other chlorinated compositions (J. J. ROOK, J. Wat. Treat. Exam. 22,234(1974); S. MONARCA et al. AMBIENTE RISORSE SALUTE, Nov. 1989). It is therefore evident that the main source of products having a mutagenic activity in drinking-waters arises from the very purifying treatment of such waters, carried out through the utilization of chlorine and/or its derivatives. This has been confirmed by several researches carried out on water samples taken from purifying plants of some towns of the U.S., Europe and even of Italy (P. DOLARA et al. Bull. Environ. Contam. Toxicol. 27,1(1981); S. MONARCA, D. A. Sept. 1988; S. MONARCA et al. Int. J. of Environmental Health Res. 2,192–200 (1992)).

Besides, the purifying of water by chlorination takes place according to a rather long and complicated process, made up by several steps, and which comprises: a first treatment of raw water drawn from the available hydric source with chlorine and its derivatives, such as, for instance, hypochlorites or chlorine dioxide in strong excess, in order to perform a first disinfection; a subsequent filtration treatment, for instance on active carbon or the like, to remove excess chlorine and to hold back any toxic agent that might be present and/or have formed during the treatment; a third treatment with chlorine or derivatives of same, such as, for instance, hypochorites or chlorine dioxide, to keep the so treated water at an acceptable level of disinfection from bacteria, exploiting the bacteriostatic and bactericidal activity of chlorine and its derivatives.

Besides the already mentioned drawbacks, a further drawback ensuing from the aforementioned treatment is constituted by the unpleasant taste which characterizes very often drinking-waters subject to chlorination treatment; the more intense the treatment undergone, the more marked such unpleasant taste, which causes remarkable annoyances among the consumers of such waters.

Because of these drawbacks, some alternative disinfectants have been tried out in view of their utilization in the purifying cycle of waters as replacements for chlorine and its derivatives; such alternative disinfectants are constituted, for instance, by ozone, even though some researches carried out in this sense have demonstrated that, depending on the ozone concentration utilized, there may even be an increase in the mutagenicity of the treated water. Other purifying techniques provide for the treatement of waters with UV rays, or the adsorption of such waters on active carbon or on suitable resins, which involves the drawback of having to replace the filters utilized for the treatment after a period of time of no more than about one year, because of the exhaustion of such filters due to various factors.

OBJECTS OF THE INVENTION

Object therefore of this invention is to provide a process for the purifying of waters which, besides ensuring a high degree of disinfection of said waters, does not give rise to all the aforementioned drawbacks and in particular does not cause the formation of substances having a mutagenic-cancerogenic activity.

A further object of this invention is to provide a process for the purifying of waters which does not lend said waters an unpleasant taste, once the treatment has been carried out.

Still a further object of this invention is to provide a process for the purifying of waters which allows to reduce also algae and protozoans and the concentration of chlorophyl contained in waters, keeping therefore pipeworks and ducts clean and free for the circulation of said waters.

Still a further object of this invention is to provide a process for the purifying of waters which consists of a limited number of steps, being therefore simply and quickly realizable.

BACKGROUND

These and still further objects and the related advantages which shall be more clearly stressed by the following description are achieved by a process for the purifying of waters, which process, according to this invention, consists in treating the waters to be purified with an organic peracid.

More particularly, according to this invention, said organic peracid is chosen among peracetic acid, performic acid, perpropionic acid.

It has been proved that said organic peracids, and in particular peracetic acid, when added to raw waters to be purified, even at very low concentrations, for instance in the range of 0.5–2.0 ppm, develop an efficacious and intense bactericidal and bacteriostatic activity, and besides they do not lead to the formation of any mutagenic agent, differently from what happens when the traditional purifying agents of the known art are added to raw or pre-treated waters.

Besides, the addition of peracetic acid to raw waters at the usual concentrations does not cause any unpleasant taste in said waters, avoiding in this way the known inconveniences to the population of drinking-water users.

Besides, always according to this invention, the purifying treatment of waters with said organic peracids, and in particular with peracetic acid, can be carried out rapidly, and consists of a limited number of steps, which brings about remarkable advantages of economic and time savings.

Peracetic acid, according to this invention, is utilized in the purifying of waters, in form of balanced solution containing peracetic acid, water, acetic acid and hydrogen peroxide; such solutions are suitably stabilized to ensure a good preservability at ambient temperature.

This invention is described more in detail with reference to the enclosed drawings, wherein:

Figure 2:
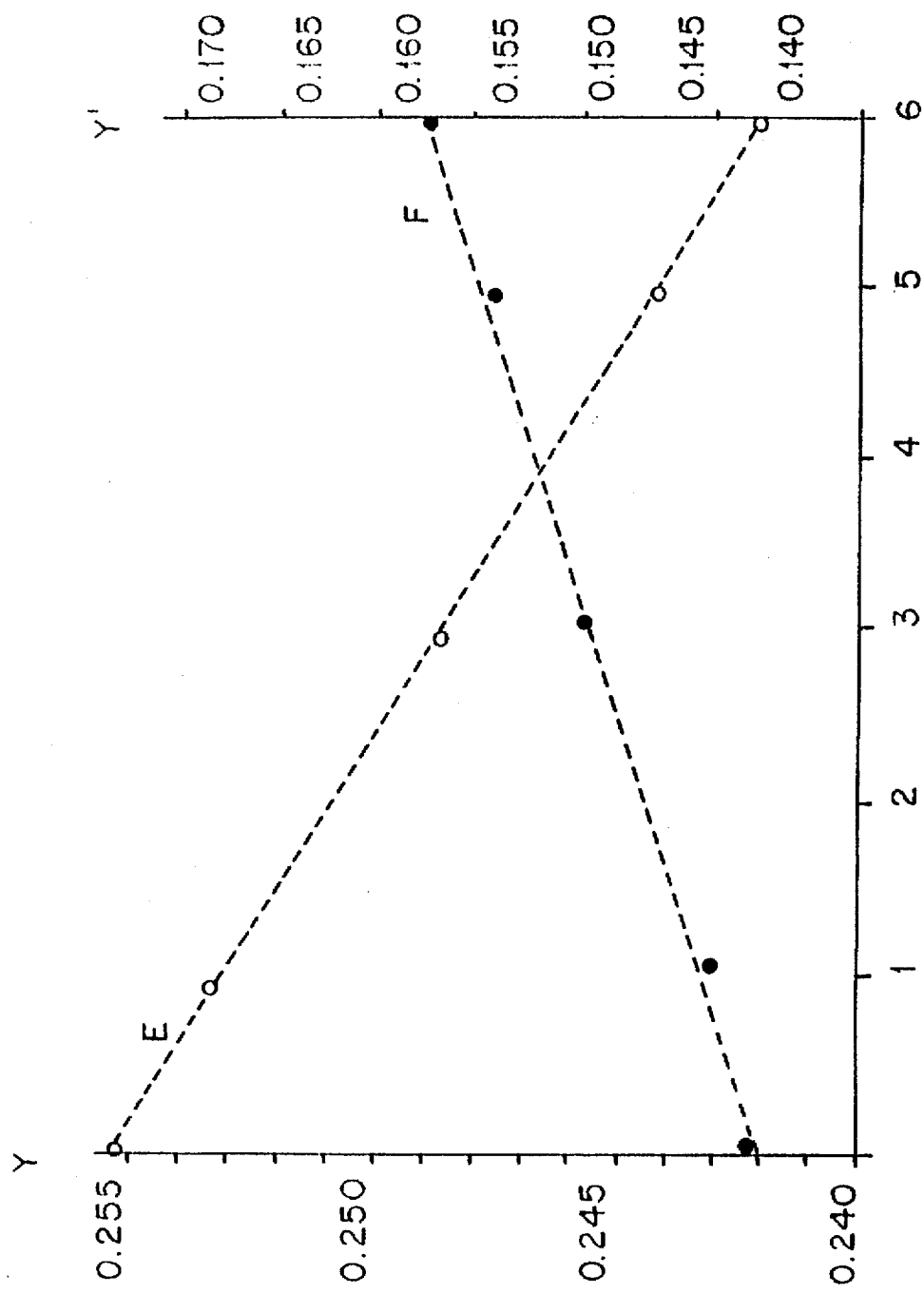
FIG. 2 shows the variation in the concentration of peracetic acid with the time and, by way of comparison, that of hydrogen peroxide.

Some tests have been carried out suitable to determine the velocity of hydrolysis of solutions, even very diluted, of peracetic acid in water; such tests have shown that the concentration of aqueous solutions of peracetic acid, though reducing with time, is still significant for a period ranging from 3 to 5 days, depending on the temperature values and the presence in the solution of other agents which may cause intereferences in the hydrolysis reaction. The aforementioned datum allows to ensure an efficacious bacteriostatic activity by the aqueous solution of peracetic acid, even if it is utilized at very low concentrations. The results of such tests are graphically illustrated in FIG. 2, where the per thousand value of peracetic acid in aqueous solution is shown on the ordinate Y, the per thousand value of hydrogen peroxide is shown on the ordinate Y', the time expressed in days is shown on the abscissa, the line indicated by E shows the concentration variation with the time of peracetic acid in aqueous solution and the line indicated by F shows the corresponding variation in the concentration of hydrogen peroxide.

It seems evident, from the results obtained, that in the working conditions of such tests, even after 5 days, the concentration of the aqueous solution of peracetic acid is still significant and such as to ensure the necessary bacteriostatic activity.

Always with the purpose of stressing the bactericidal and bacteriostatic activity of peracetic acid utilized in the treatment of waters, biological tests have been carried out suitable to determine the time and efficaciousness of the reduction by means of peracetic acid at different concentrations on a sample micro-organism, such as, for instance, Esterichia coli ATCC 8739, taking as reference a sample of water to which no peracetic acid had been added, but which had been inoculated with the same concentration of micro-organism.

In said example, the inoculum was constituted by 50/100 cfu/100 ml of micro-organism and the term cfu/100 ml indicates the value corresponding to the vital microorganisms per 100 ml.

The results are shown in Table 1 and expressed as the mean of the determinations.

TABLE 1

| SAMPLE | cfu/100 ml | | | |
|---|---|---|---|---|
| | t = 0' | t = 30' | t = 60' | t = 120' |
| 6.7 ppm of a 15% solution of peracetic acid (corresponding to 1 ppm of 100% peracetic acid) | 96 | 1 | 0 | 0 |
| 3.35 ppm of a 15% solution of peracetic acid (corresponding to 0.5 ppm of 100% peracetic acid). | 56 | 0 | 0 | 0 |

It is evident from the above Table 1 that already after thirty minutes of contact the complete disappearance of coliforms has been obtained, and this disappearance is found also after 120 minutes of contact, which proves the bactericidal and bacteriostatic activity of the solutions of peracetic acid utilized in the above described conditions. A short term mutagenesis assay derived from the "Ames' test" has been carried out, which measures the capacity of producing punctiform genetic mutations in special strains of Salmonellae by individual compositions or by complex mixes of compositions (B. N. AMES et al., Mutation Res. 31,347 (1975); S. MONARCA D. A., Sett. 1988).

In this assay, the water samples to be analyzed have been prepared by concentrating the organic substances present according to techniques known in the literature, for instance, by adsorption on resins, in order to increase the sensitivity of the test.

In the example given, for which Salmonellae of the TA98 strain have been utilized, the blank is constituted by a sample of distilled water inoculated with the established concentration of micro-organism, the starting point is constituted by a sample of water as it is, suitably concentrated and also inoculated with the established concentration of micro-organism, while the subsequent samples are constituted by water as it is suitably concentrated and additivated in one case with variable concentrations of peracetic acid and in another case with variable concentrations of sodium hypochlorite; for all these samples the mutagenicity ratio is evaluated by taking the blank as reference; such ratio indicates the mutagenic potential of a solution: the higher the value of the mutagenic ratio, the more potentially mutagenic the composition. The results are shown in Table 2 and the mutagenicity ratio is expressed as the mean of two determinations.

TABLE 2

| SAMPLE | MUTAGENICITY RATIO |
| --- | --- |
| SAMPLE AS IT IS | 1.3 |
| SAMPLE additive: | |
| 0.2 ppm Cl | 1.35 |
| 0.2 ppm peracetic acid | 1.10 |
| 0.5 ppm Cl | 1.60 |
| 0.5 ppm peracetic acid | 1.20 |
| 1 ppm Cl | 1.90 |
| 1 ppm peracetic acid | 1.30 |

Figure 1:
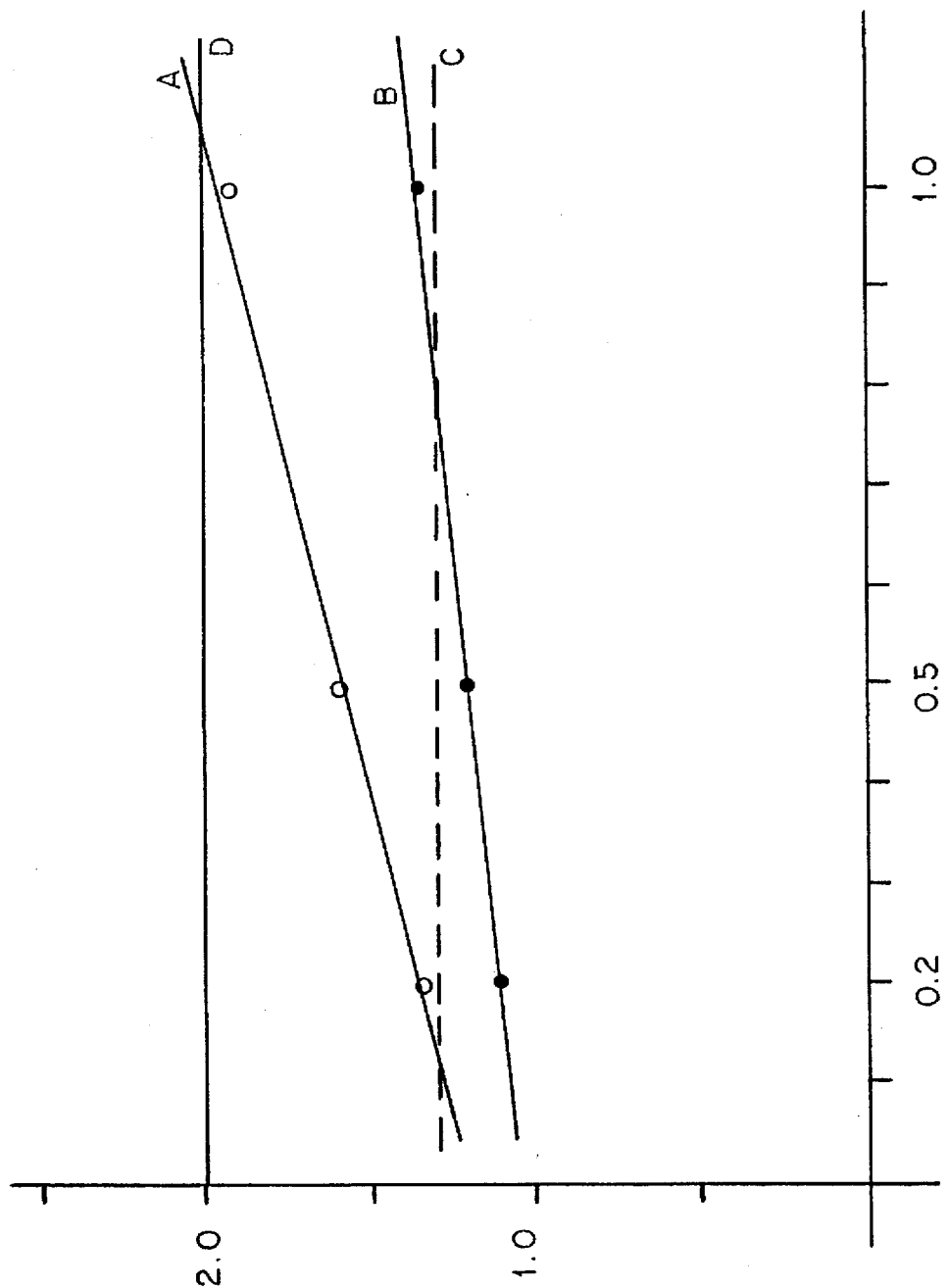
FIG. 1 shows graphically the mutagenicity ratio as a function of the concentration of an added purifying agent.

The same results are graphically illustrated in FIG. 1, where the mutagenicity ratio is shown on the ordinate, the concentration of added purifying agent, expressed as ppm of active principle, is shown on abscisse, the broken line (indicated by C) corresponds to the value of the mutagenicity ratio of the water sample before the disinfection/purifying treatment (sample as it is of Table 2), the continuous line (indicated by D) represents the minimum value of the mutagenicity ratio beyond which a mutagenicity activity can be said to exist, the line indicated by A shows the trend of the values of the mutagenicity ratio when the purifying is carried out with sodium hypochlorite at increasing concentrations, while the line indicated by B shows the trend of the values of the mutagenicity ratio when the purifying is carried out with peracetic acid at increasing concentrations. It is evident from the results obtained that even at concentrations equal to 1 ppm of peracetic acid, the value of the mutagenicity ratio has not substantially changed relatively to the value determined on the water before the treatment, while in the case of treatments carried out with sodium hypochlorite the value of the mutagenicity ratio has markedly increased, relatively to the value determined on the water before the treatment, already at concentrations of 0.5 ppm. There are also indicated the ecotoxicity data as given by the literature; such values are as follows:

| Pleuronectes platessa | LC50, 96 h | 89.1 mg/l |
| --- | --- | --- |
| Crangon crangon | LC50, 96 h | 126.8 mg/l |
| Mytilus edulis | EC50, 48 h | 2.15 mg/l |
| Crassostrea gigas | EC50, 48 h | 2.25 mg/l |
| Daphnia magna | EC50, 48 h | 3.3 mg/l |
| Salmo gairdneri | LC50, 96 h | 13.0 mg/l |

As said, according to this invention, said purifying treatment can be efficaciously carried out also utilizing, for instance, perpropionic acid or performic acid; if performic acid is utilized, said acid shall be produced on site, as the regulations in force do not allow its transportation.

Always according to this invention, if the raw waters should have, before the purifying treatment, too high a value of the mutagenicity ratio, such as to exceed the maximum limit allowed, it might be appropriate to carry out a first depuration treatment, for instance by filtration according to known techniques, and thereafter a treatment with one as preferred of said organic peracids to carry out the proper purifying of said waters.

Figure 3:
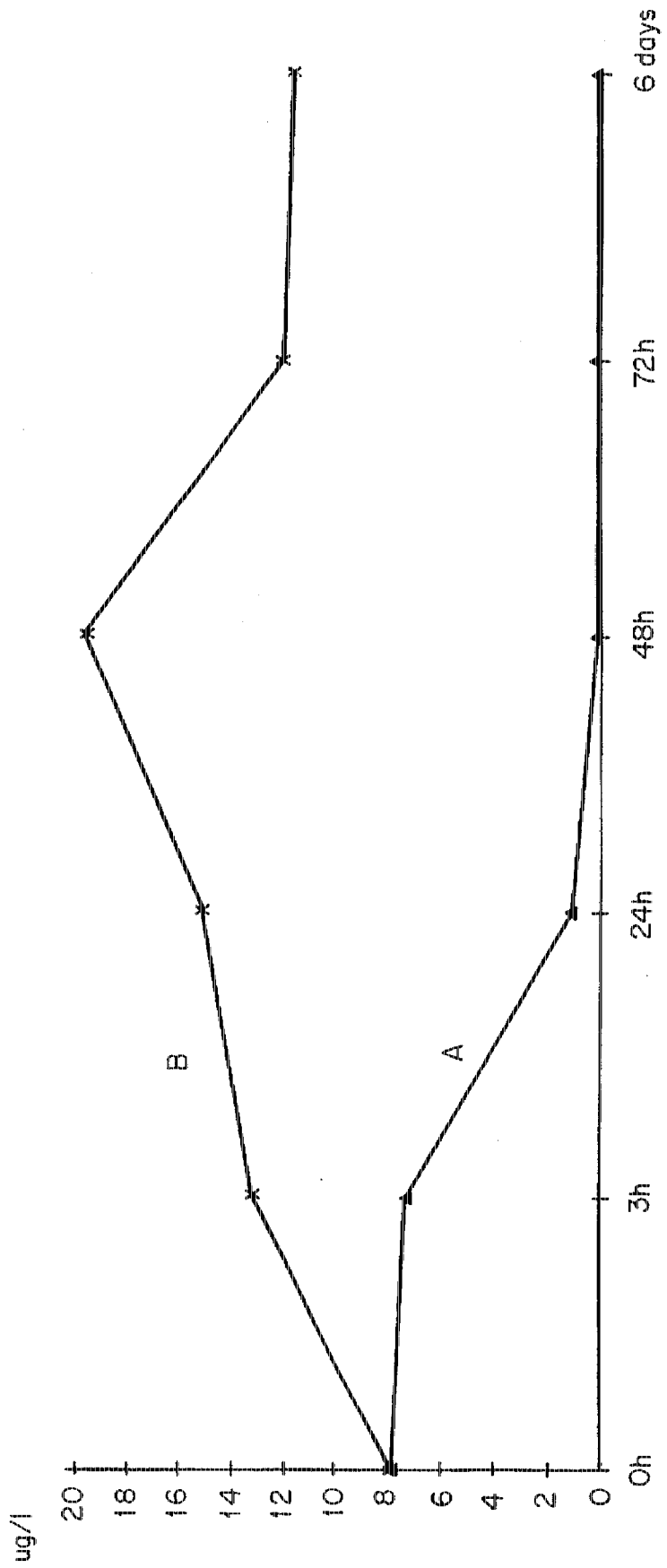
FIG. 3 shows the variation in the concentration of chlorophyl in a sample of water treated with 10 ppm of peracetic acid.
Figure 4:
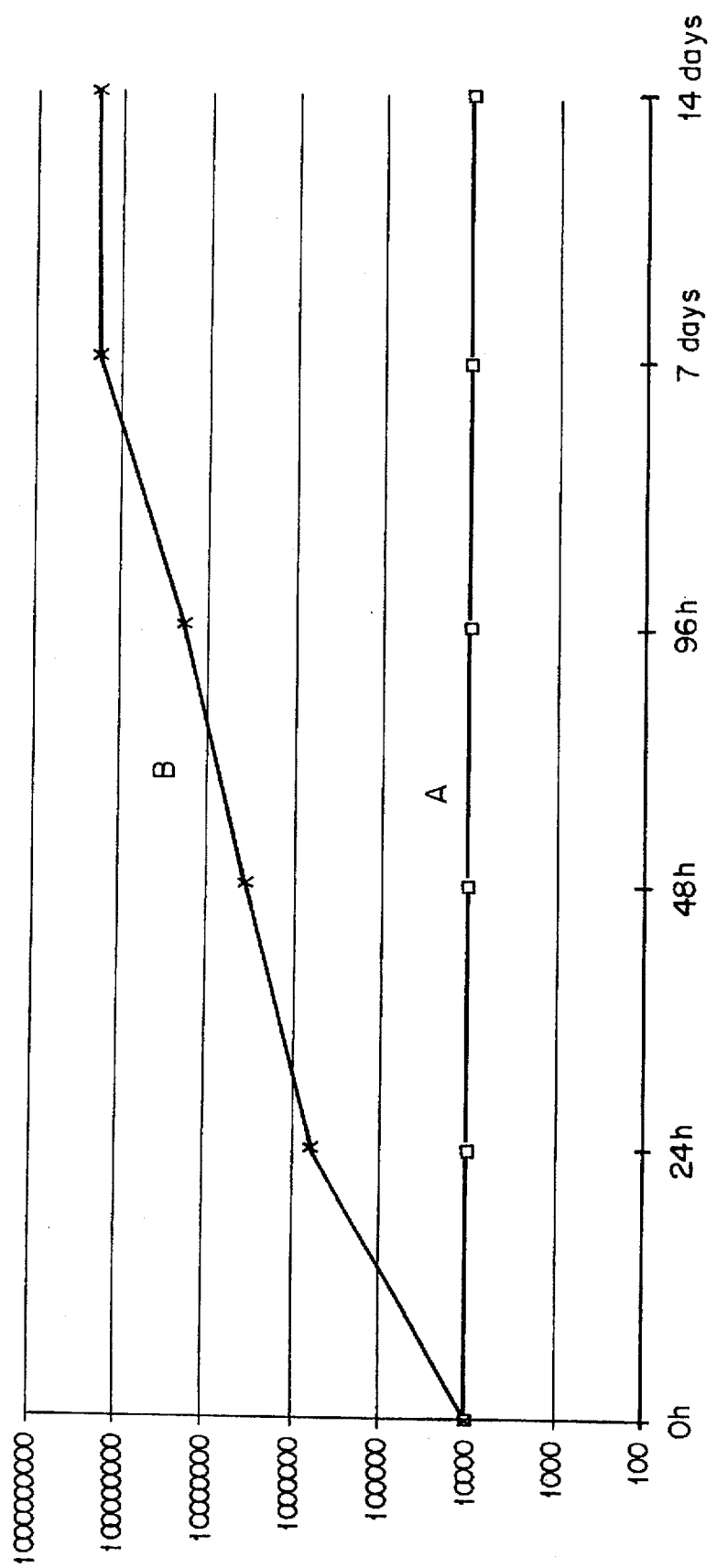
FIG. 4 shows the variation in the number of algae as a function of the time in a sample treated with peracetic acid.

Besides, it has been observed that peracetic acid, even at very low concentrations in the range of 5–10 ppm, i.e. almost the concentrations normally utilized for the purifying of waters (which, as said, range between 0.5–2 ppm), can reduce algae and protozoans, and therefore the concentration of chlorophyl present in waters. The diagram of FIG. 3 shows the variation in the concentration in µg/2 of chlorophyl with time in a sample treated with peracetic acid at the concentration of 10 ppm (curve A), and, as a reference, in a not treated control sample (curve B), while the diagram of FIG. 4 shows on the ordinates, in logarithmic scale, the number of algae/ml of S. capricornutum as a function of the time by contact with a solution containing 10 ppm of peracetic acid (curve A) in comparison with a control sample (curve B).

Peracetic acid can be therefore advantageously utilized for cleaning natural or artificial basins to be utilized to contain upstream the water to be purified. Besides, the so treated water, thanks to the presence of peracetic acid, does not give rise to any formation of algae in pipeworks, which remain therefore clean and free, with remarkable advantages for their maintenance. The quantity of peracetic acid utilized upstream for the reduction of algae is integrated afterwards, if necessary, with a further quantity of peracetic acid for the final purifying. Peracetic acid can even be over-dosed without any risk of damaging the ecosystem, as it has been proved that the toxicity value of peracetic acid, for instance for *Daphnia magna*, is of about 1.5 ppm.

However, as peracetic acid decomposes with time, also this toxicity disappears with time, *Daphnia magna* can grow again and in this way the ecosystem is safeguarded.

Tests have been carried out on water drawn from a small lake used for irrigation, having the following characteristics:

| Temperature | 13° C. |
| --- | --- |
| pH (at 20° C.) | 8 to 11 |
| O.D. | 12.1 mg/l |
| Total hardness | 32.0 F |
| Turbidity | 4 mg/l $SiO_2$ |
| Number of algae | $6 \times 10^5$/ml |

Algae: Cosmarium (+++), Chlorella (+), Scenedesmus (+), Diatomeae (+), Euglena (+)
Protozoans: Holotrich ciliated protozoans of the Colpes genus, flagellates, amoebae.
Metazoans: Dead and broken nematodes.

Tests have proved that amounts of peracetic acid smaller than 10 ppm are more than sufficient to reduce algae and therefore the concentration of chlorophyl present in waters, as illustrated in FIGS. 3 and 4.

As concerns *Selenastrum capricornutum*, peracetic acid prevents completely the growth starting from concentrations higher than 2.5 ppm, while by 1 ppm of peracetic acid, the velocity of the growth strongly reduces.

Figure 5:
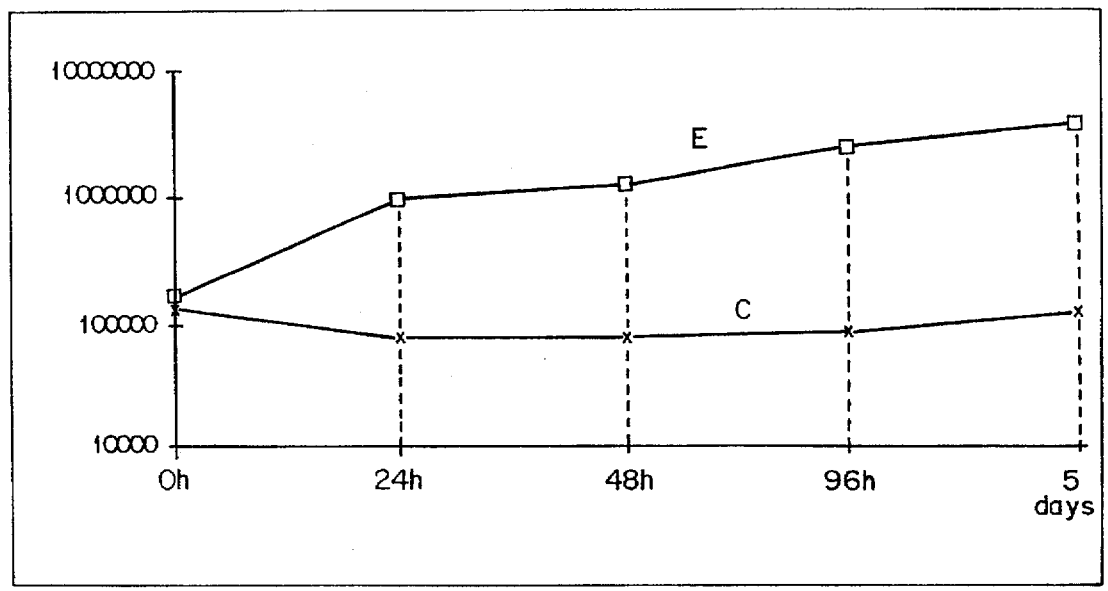
FIGS. 5 and 6 show the variation in the number of algae of S. capricornutum as a function of the time in samples treated respectively with 5 ppm and with 2.5 ppm of peracetic acid.
Figure 6:
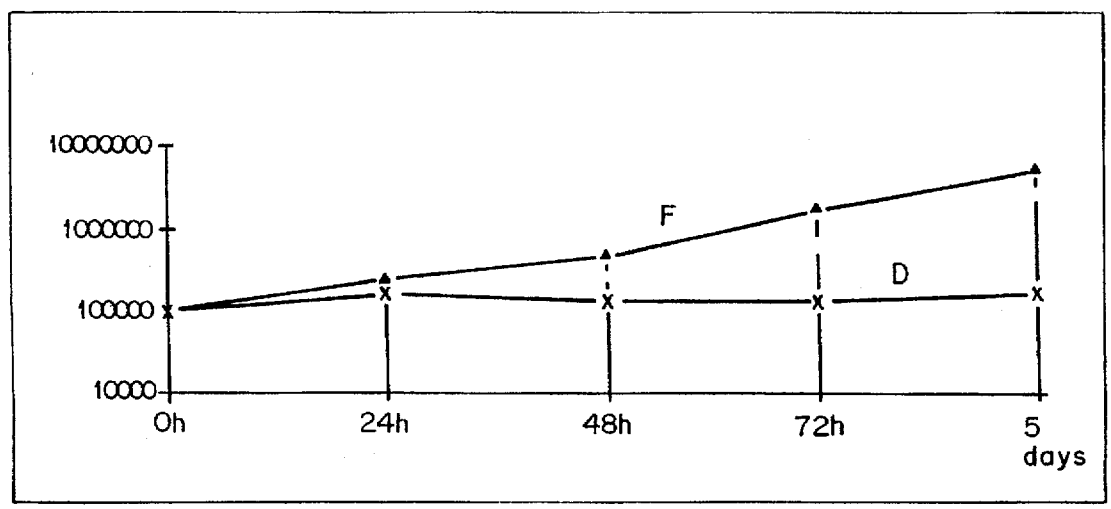

The diagrams of FIGS. 5 and 6 show on the ordinates in logarithmic scale the number of algae S. *capricornutum* as a function of the time, respectively by contact with solutions containing 5 ppm (curve C) and 2.5 ppm of peracetic acid (curve D), with reference to control samples (curves E and F respectively).

Tests have been carried out to evaluate the ecotoxicity of *Daphnia magna*. Such tests have shown that the value of IC50 (real mean concentration) capable of immobilizing 50% of the organisms within 24 hours amounts to 1.4 ppm (mean value of 5 determinations).

At the concentrations which, from these tests, seem to be suitable for the purifying of waters, peracetic acid has proved to be active for reducing, at concentrations smaller than $10^3$ ufc/ml, the *Pseudomonas aeruginosa* present in waters.

Ecotoxicity induced in waters by the addition of 10 ppm of peracetic acid disappears completely after 4/6 days of treatment. After such period, *Daphnia magna* can develop again in the sample of treated water.

The test of reduction of coliforms have proved that concentrations of 0.5–2 ppm of peracetic acid suffice to reduce the bacterial load and to return within drinkablehess criteria.

At these concentrations, peracetic acid is at the borderline of the IC50 value of *Daphnia magna* and therefore decidedly under the toxicity induced by hypochlorite.

Besides, peracetic acid at the concentrations utilized is active also for the reduction of algae and protozoans.

For the cleaning of basins it can be utilized up to the concentration of 10 ppm without inducing permanent toxicity (towards *Daphnia magna*) in waters.

The reduction in *Pseudomonas aeruginosa*, even though it is not particularly significant for the drinkableness of waters, is however a determining value when these waters are utilized for sports-activities, such as swimming pools and the like.

The process for the purifying of waters subject matter of this invention comprises a step constituted by the addition of an organic peracid, chosen among those already described, to the waters to be purified, possibly preceded by a step of purifying of said waters, and is therefore remarkably economic and of simple and rapid realization.

I claim:

1. Process for the purifying of waters, containing bacteria, algae and protozoan comprising the steps of purifying said waters with an effective amount of an organic peracid in a concentration ranging from 0.5 to 2 ppm and selected from the group consisting of peracetic acid, performic acid and perpropionic acid to reduce said bacteria, algae and protozoan, and to produce purified waters; and using said purified waters for human consumption, without giving rise to the formation of mutagenic-cancerogenic agents.

2. Process for the purifying of waters according to claim 1, wherein said organic peracid is an effective amount of peracetic acid.

3. Process for the purifying of waters according to claim 1, wherein said organic peracid is an effective amount of performic acid.

4. Process for the purifying of waters according to claim 1, wherein said organic peracid is an effective amount of perpropionic acid.

5. Process according to claim 1, wherein said concentration is an initial concentration.

6. Process to depurate basins, pipeworks, ducts, containing algae, and protozoans in waters used for human consumption comprising the steps of treating said waters in said basins, pipeworks, ducts, with solutions of peracetic acid, at concentrations ranging from 0.5 to 2 ppm to reduce said algae and protozoans;

so as to purify said waters for human consumption, without, after purifying, giving rise to the formation of mutagenic-cancerogenic agents; and using said waters after purifying for human consumption.

7. Process according to claim 6, wherein said concentration is an initial concentration.

8. Process for the purifying of waters, containing algae and protozoan comprising the steps of purifying said waters with an effective amount of an organic peracid in a concentration ranging from 0.5 to 2 ppm and selected from the group consisting of peracetic acid, performic acid and perpropionic acid to reduce said algae and protozoan, and to produce purified waters; and using said purified waters for human consumption, without giving rise to the formation of mutagenic-cancerogenic agents.

9. Process according to claim 8, wherein said concentration is an initial concentration.

* * * * *